(12) United States Patent
Hozumi et al.

(10) Patent No.: US 9,708,143 B2
(45) Date of Patent: Jul. 18, 2017

(54) BELT DEVICE AND IMAGE FORMING APPARATUS INCLUDING SAME

(71) Applicants: Yoshiki Hozumi, Kanagawa (JP); Naoki Iwaya, Tokyo (JP); Masaharu Furuya, Kanagawa (JP); Yasufumi Takahashi, Kanagawa (JP); Naomi Sugimoto, Kanagawa (JP); Kazuchika Saeki, Kanagawa (JP)

(72) Inventors: Yoshiki Hozumi, Kanagawa (JP); Naoki Iwaya, Tokyo (JP); Masaharu Furuya, Kanagawa (JP); Yasufumi Takahashi, Kanagawa (JP); Naomi Sugimoto, Kanagawa (JP); Kazuchika Saeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 143 days.

(21) Appl. No.: 14/690,857

(22) Filed: Apr. 20, 2015

(65) Prior Publication Data
US 2015/0314976 A1    Nov. 5, 2015

(30) Foreign Application Priority Data

May 2, 2014    (JP) ................................. 2014-095346

(51) Int. Cl.
*G03G 15/00*    (2006.01)
*B65H 5/02*    (2006.01)
(Continued)

(52) U.S. Cl.
CPC ............. *B65H 5/021* (2013.01); *B65G 15/64* (2013.01); *G03G 15/1615* (2013.01);
(Continued)

(58) Field of Classification Search
CPC ..... B65H 5/021; B65G 15/64; G03G 15/1615
(Continued)

(56) References Cited

U.S. PATENT DOCUMENTS 5,708,933 A * 1/1998 Nogami ................. H04N 1/121
                                                       399/167
2011/0222920 A1* 9/2011 Kobayashi ......... G03G 15/0194
                                                       399/299
(Continued)

FOREIGN PATENT DOCUMENTS

JP    2000-081804    3/2000
JP    2006-267243    10/2006
(Continued)

OTHER PUBLICATIONS

U.S. Appl. No. 14/796,353, filed Jul. 10, 2015, Yoshiki Hozumi, et al.
(Continued)

*Primary Examiner* — Quana M Grainger
(74) *Attorney, Agent, or Firm* — Oblon, McClelland, Maier & Neustadt, L.L.P.

(57) ABSTRACT

A belt device for an image forming apparatus, includes an endless belt; a first and second support rollers, each including a rotary shaft, that support the belt with tension; a contacted member that contacts the belt; a shaft displacement device to displace any of the rotary shafts of the support rollers; and a main rotary shaft disposed at a side of the rotary shaft of the first support roller moved by the shaft displacement device along a stretching direction of the stretched surface of the endless belt that the contacted member contacts, relative to a contact portion between the endless belt and the contacted member, and at an opposite side of the contacted member in a direction perpendicular to the stretching direction of the endless belt. As the first support roller and the second roller rotate about the main rotary shaft, the endless belt is separated from the contacted member.

8 Claims, 7 Drawing Sheets

(51) Int. Cl.
*B65G 15/64* (2006.01)
*G03G 15/16* (2006.01)

(52) U.S. Cl.
CPC .... *B65H 2404/25* (2013.01); *B65H 2404/255* (2013.01); *B65H 2801/09* (2013.01); *G03G 2215/1623* (2013.01)

(58) Field of Classification Search
USPC ......................................................... 399/302
See application file for complete search history.

(56) References Cited

U.S. PATENT DOCUMENTS

| | | |
|---|---|---|
| 2013/0306440 A1 | 11/2013 | Asaoka et al. |
| 2013/0306441 A1 | 11/2013 | Asaoka et al. |
| 2014/0008184 A1 | 1/2014 | Hozumi et al. |
| 2014/0083821 A1* | 3/2014 | Hozumi ............. G03G 15/1615 198/806 |
| 2014/0183007 A1 | 7/2014 | Hozumi et al. |
| 2014/0209437 A1 | 7/2014 | Hozumi et al. |

FOREIGN PATENT DOCUMENTS

| | | |
|---|---|---|
| JP | 2010-230958 | 10/2010 |
| JP | 2012-103286 | 5/2012 |
| JP | 2012-226049 | 11/2012 |

OTHER PUBLICATIONS

U.S. Appl. No. 14/605,459, filed Jan. 26, 2015, Yoshiki Hozumi, et al.
U.S. Appl. No. 14/488,644, filed Sep. 17, 2014.
U.S. Appl. No. 14/524,077, filed Oct. 27, 2014.
U.S. Appl. No. 14/507,087, filed Oct. 6, 2014.

* cited by examiner

BELT DEVICE AND IMAGE FORMING APPARATUS INCLUDING SAME

CROSS-REFERENCE TO RELATED APPLICATION

The present application claims priority pursuant to 35 U.S.C. §119(a) from Japanese patent application number 2014-095346, filed on May 2, 2014, the entire disclosure of which is incorporated by reference herein.

BACKGROUND

Technical Field

Exemplary embodiments of the present invention relate to a belt device including an endless belt supported by a plurality of support rollers, and to an image forming apparatus such as a printer, a facsimile machine, or a copier, including the belt device.

Description of the Related Art

Color image forming apparatuses are known in which toner images of respective colors formed on a latent image carrier are primarily transferred to an intermediate transfer body in a primary transfer process, and secondarily transferred onto a sheet member in a secondary transfer process.

A secondary transfer unit of the above type of apparatus employs either a roller transfer method or a belt transfer method. In the roller transfer method, the sheet member is conveyed while being sandwiched by the intermediate transfer body and a transfer roller disposed in the secondary transfer unit, during which the secondary transfer is performed. On the other hand, in the belt transfer method, the sheet member is conveyed while being sandwiched by an endless belt (i.e., a secondary transfer belt) entrained around support rollers of the secondary transfer unit and the intermediate transfer body, during which the secondary transfer is performed.

In the belt transfer method, the sheet member is adsorbed to and conveyed at at least one portion of the secondary transfer belt upstream of the sheet conveyance direction or downstream thereof where the sheet member is sandwiched between the intermediate transfer body and the belt member (or a so-called secondary transfer nip). As a result, the sheet member is held and applied with a conveyance force not only at the secondary transfer nip where the sheet member is sandwiched between the intermediate transfer body and the belt member but also upstream and downstream in the sheet conveyance direction. Accordingly, the belt transfer method is preferable to the roller transfer method for its stable conveyance of the sheet member.

However, in the belt transfer method employing the belt, the secondary transfer belt sometimes walks to one side of the belt in the width direction (that is, belt walking), or the belt repeatedly walks to one side or the other reciprocally (that is, belt walk) similarly to any common belt conveyance device. The belt walking including wobbling occurs due to dimensional tolerances arising in assembling devices forming the secondary transfer unit, including misalignment of the rotary shaft of the plurality of support rollers around which the secondary transfer belt is entrained, variations in an outer diameter of each roller, uneven tension due to changes in the perimeter length of the secondary transfer belt itself, and the like. More specifically, when the secondary transfer belt does not rotate linearly due to those reasons and rotates with the support roller shaft deviated in the belt width direction, the belt walks toward the deviated direction.

Conventionally, various belt walk prevention means have been proposed to restrict the belt widthwise moving range within a predetermined range.

In one approach, a steering roller (or a support roller) around which the belt is entrained, inclines upon detection of the belt walking, so that the belt is moved in a direction that corrects the belt walking, which is a so-called shaft leaning device. The above approach includes a sensor to detect belt walk, and controls the inclination of the steering roller based on the detection result of the sensor.

In another approach, without using a sensor, an inclinable belt walk correction roll (or a support roller), around which the belt is entrained, is disposed. By inclining a rotary shaft of the belt walk correction roll, the belt is moved in a direction that corrects the belt walking. The belt walk correction roll includes a belt walk correction unit movably disposed at an end of the shaft thereof along the roll shaft.

SUMMARY

In one embodiment of the disclosure, there is provided an optimal belt device for an image forming apparatus. The belt device includes an endless belt; a first support roller and a second support roller, each including a rotary shaft, that support the endless belt with tension; a contacted member that contacts the endless belt; a shaft displacement device to displace any of the rotary shafts of the support rollers; and a main rotary shaft disposed at a side of the rotary shaft of the first support roller moved by the shaft displacement device along a stretching direction of the stretched surface of the endless belt that the contacted member contacts, relative to a contact portion between the endless belt and the contacted member, and at an opposite side of the contacted member in a direction perpendicular to the stretching direction of the endless belt. As the first support roller and the second roller rotate about the main rotary shaft, the endless belt is separated from the contacted member.

In another embodiment of the disclosure, there is provided an optimal image forming apparatus including the belt device.

These and other objects, features, and advantages of the present invention will become apparent upon consideration of the following description of the preferred embodiments of the present invention when taken in conjunction with the accompanying drawings.

DETAILED DESCRIPTION

Hereinafter, a printer as an image forming apparatus employing electrophotography to which exemplary embodiments of the present invention are applied, will be described with reference to drawings.

Figure 1:
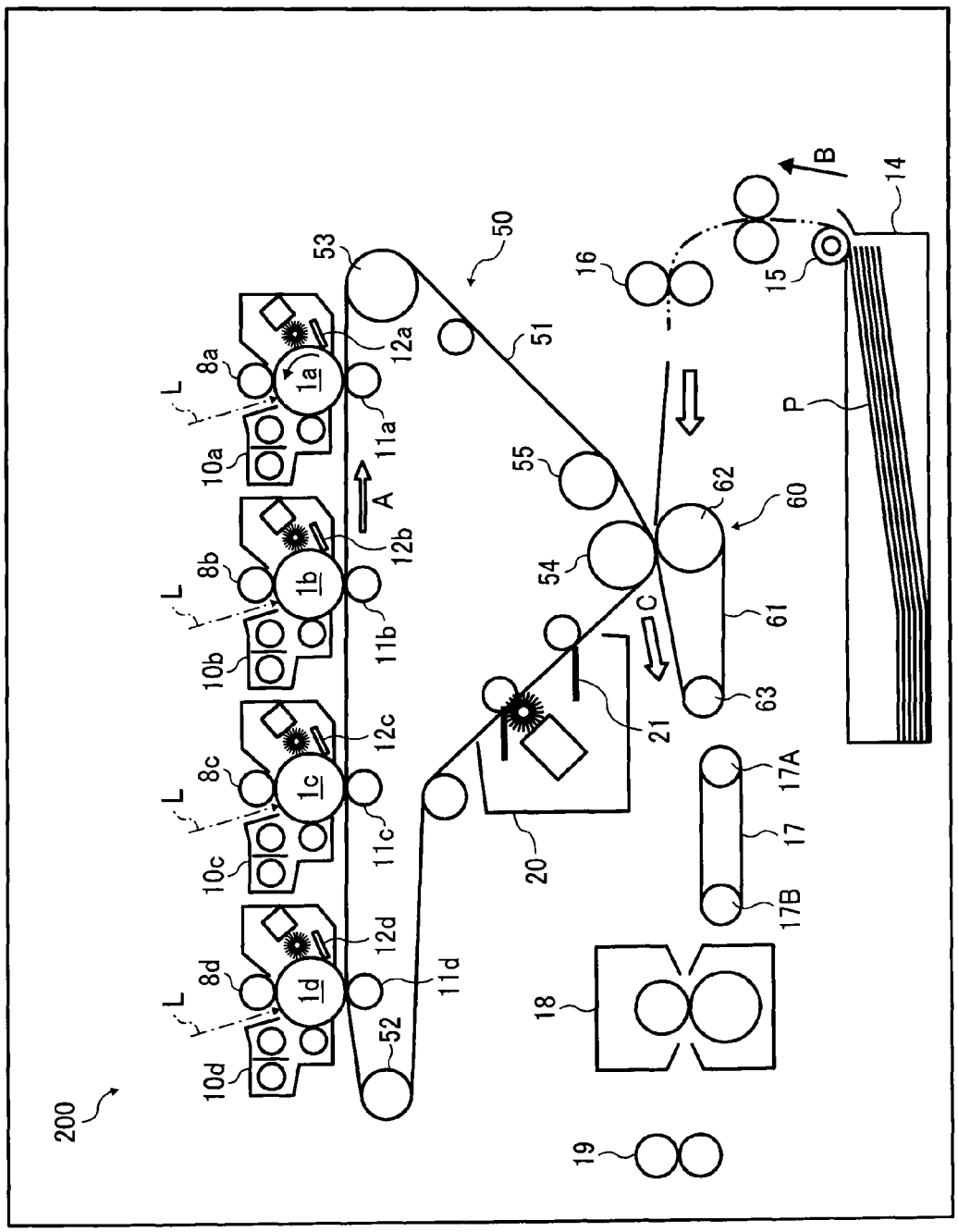
FIG. 1 illustrates a general configuration of a printer according to an embodiment of the present invention.

FIG. 1 schematically illustrates a basic configuration of a printer 200 according to an embodiment of the present invention.

The present printer 200 includes four photoconductors 1a to 1d disposed inside a main chassis of the printer 200. Each photoconductor 1a, 1b, 1c, and 1d is configured to form a toner image with a color different from each other. Specifically, each photoconductor 1a to 1d forms a black toner image, a magenta toner image, a cyan toner image, and a yellow toner image, respectively. Further, as illustrated in FIG. 1, the photoconductors 1a, 1b, 1c, and 1d each are formed to have a drum shape, but an endless-belt-shaped photoconductor may be used such that the belt shaped body is wound around a plurality of rollers and is rotatably driven.

An endless-belt-shaped intermediate transfer belt 51 as an image carrier and an intermediate transfer member is disposed opposite the four photoconductors 1a, 1b, 1c, and 1d. Each outer surface of the photoconductors 1a, 1b, 1c, and 1d contacts an outer circumferential surface of the intermediate transfer belt 51. The intermediate transfer belt 51 is wound around, with tension, support rollers such as a tension roller 52, a drive roller 53, a repulsive force roller 54, and an entrance roller 55. The drive roller 53 that is rotated by a drive source, drives the intermediate transfer belt 51 to rotate in a direction of arrow mark A as illustrated in FIG. 1.

The intermediate transfer belt 51 may employ a multi-layer structure or a single-layer structure. When the intermediate transfer belt 51 is formed of the multi-layer belt, the belt 51 preferably includes a base layer formed of less elastic fluorine resins, polyvinylidene fluoride (PVDF) sheet, or polyimide resins, and a coat layer with a higher smoothness such as fluorine resins, disposed on the outer surface of the belt. If the single-layer belt is employed, preferred materials include PVDF, PC, and Polyimide.

Each of the photoconductors 1a, 1b, 1c, and 1d is configured to perform toner image formation of respective colors and transfer the toner image onto the intermediate transfer belt 51 in the substantially similar manner, except that the color of the toner each photoconductor handles is different. Accordingly, hereinafter, a structure and operation of the photoconductor 1a to form a black toner image and primarily transfer the black toner image will be described, and description concerning the other colors will be omitted.

The photoconductor 1a for black rotates in the counter-clockwise direction as illustrated in FIG. 1. Light from a discharger is irradiated on the outer surface of the photoconductor 1a, so that a surface potential on the photoconductor 1a is initialized. The initialized outer surface of the photoconductor is uniformly charged by a charger 8a to a predetermined polarity, i.e., in the present embodiment, to a minus polarity. The thus-charged outer surface of the photoconductor is irradiated with a light-modulated laser beam L from an exposure device, so that an electrostatic latent image is formed on the outer surface of the photoconductor 1a. In the present embodiment, the exposure device that emits laser beams L includes a laser writing device, but alternatively, another type of exposure device including an LED array and an imaging device may be employed. The electrostatic latent image formed on the photoconductor 1a is rendered visible as a black toner image when passing through a development area positioned opposite the developing device 10a.

On the other hand, in an interior of the intermediate transfer belt 51, a primary transfer roller 11a is disposed at a position opposite the photoconductor 1a with the intermediate transfer belt 51 sandwiched in between. The primary transfer roller 11a contacts the interior of the intermediate transfer belt 51, so that a transfer nip is formed appropriately between the photoconductor 1a and the intermediate transfer belt 51. The primary transfer roller 11a is applied with a primary transfer voltage having a polarity opposite that of the toner image formed on the photoconductor 1a, that is, plus polarity in the present embodiment. As a result, a primary transfer electric field is formed between the photoconductor 1a and the intermediate transfer belt 51, and the black toner image on the photoconductor 1a is electrostatically transferred onto the intermediate transfer belt 51 that rotates in synchronous with the photoconductor 1a. Residual toner remaining on the outer surface of the photoconductor 1a after the black toner image has been primarily transferred to the intermediate transfer belt 51 is removed by a cleaner 12a and the outer surface of the photoconductor 1a is cleaned.

In the full-color mode using all toner images of four colors, other three photoconductors 1b, 1c, and 1d form a magenta toner image, a cyan toner image, and a yellow toner image, respectively. The toner images of other colors are sequentially and primarily transferred/superimposed on the black toner image that has been primarily transferred on the surface of the intermediate transfer belt 51.

On the other hand, in the black monochrome mode, a separation mechanism works to separate the primary transfer rollers 11b, 11c, and 11d from the photoconductors 1b, 1c, and 1d, so that the photoconductors 1b, 1c, and 1d for magenta, cyan, and yellow colors are separated from the intermediate transfer belt 51. In this case, the black photoconductor 1a for black alone contacts the intermediate transfer belt 51, so that the black toner image is solely, primarily transferred onto the intermediate transfer belt 51.

As illustrated in FIG. 1, a sheet feed unit 14 is disposed in the bottom of the printer body. The sheet feed unit 14 sends a transfer sheet P in a direction of an arrow B when a sheet feed roller 15 rotates. The transfer sheet P fed from the sheet feed unit 14 is conveyed at a predetermined timing by a registration roller pair 16 to a secondary transfer nip portion between a portion of the intermediate transfer belt 51 wound around the repulsive force roller 54 and a portion of a secondary transfer belt 61 disposed opposite the repulsive force roller 54. At this time, a predetermined secondary transfer voltage is applied to the repulsive force roller 54, whereby the toner image on the intermediate transfer belt 51 is secondarily transferred onto the transfer sheet P.

The secondary transfer belt 61 as a belt member according to the present embodiment is entrained around a secondary transfer roller 62 and a separation roller 63. The secondary transfer roller 62 rotates as a drive roller, so that the secondary transfer belt 61 runs to rotate in the direction as indicated by an arrow C in FIG. 1. The transfer sheet P on which the toner image is secondarily transferred is electrostatically adsorbed to onto the outer surface of the secondary transfer belt 61 and is conveyed accompanied by the secondary transfer belt 61. The transfer sheet P separates from the outer surface of the secondary transfer belt 61 by a curvature of a portion of the secondary transfer belt 61 wound around the separation roller 63, and is conveyed further downstream in the sheet conveyance direction via a conveyance belt 17 disposed downstream of the secondary transfer belt 61.

The conveyance belt 17 is entrained around an entrance roller 17a serving as a drive roller, and a driven roller 17B. Preferred materials of the conveyance belt 17 according to an embodiment of the present invention include for example ethylene-propylene-diene monomer rubber (EPDM), of which the preferred thickness is 1 mm.

When the transfer sheet P conveyed to a fixing device 18 passes through the fixing device 18, the toner image on the transfer sheet P is fixed onto the transfer sheet P with heat and pressure. The transfer sheet P that has passed through the fixing device 18 is ejected outside the apparatus through a sheet discharge roller pair 19 disposed in a sheet discharge section.

The residual toner remaining on the intermediate transfer belt 51 after the secondary transfer of the toner image is removed by a belt cleaner 20. The belt cleaner 20 according to the present embodiment employs a blade-shaped cleaning blade 21 formed of urethane. The cleaning blade 21 cleans a surface of the intermediate transfer belt 51 by contacting in a counter direction relative to the rotating direction of intermediate transfer belt 51. The belt cleaner 20 may employ various types of cleaners, and, for example, the cleaner may be configured to clean the belt surface electrostatically.

Next, a secondary transfer unit 60 as a belt unit including the secondary transfer belt 61 will be described, with particular attention paid to structure and operation of a belt walk regulator. The secondary transfer unit 60 employs a shaft leaning device 70 to control the belt walk amount. The shaft leaning device 70 allows a rotary shaft of the separation roller 63 as one of the support rollers around which the secondary transfer belt 61 is entrained to lean, so as to keep belt walk of the secondary transfer belt 61 that moves in the belt width direction within a predetermined range.

Figure 2:
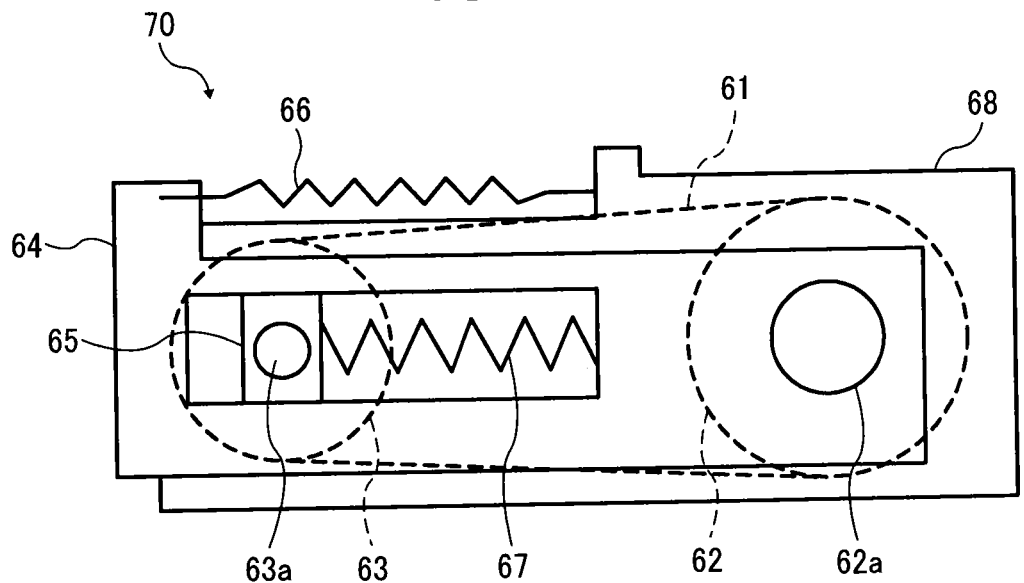
FIG. 2 schematically illustrates a structure of a shaft leaning device of a secondary transfer unit of the printer, in a state immediately after the shaft leaning device is attached to the printer, viewed axially along a separation roller.
Figure 3:
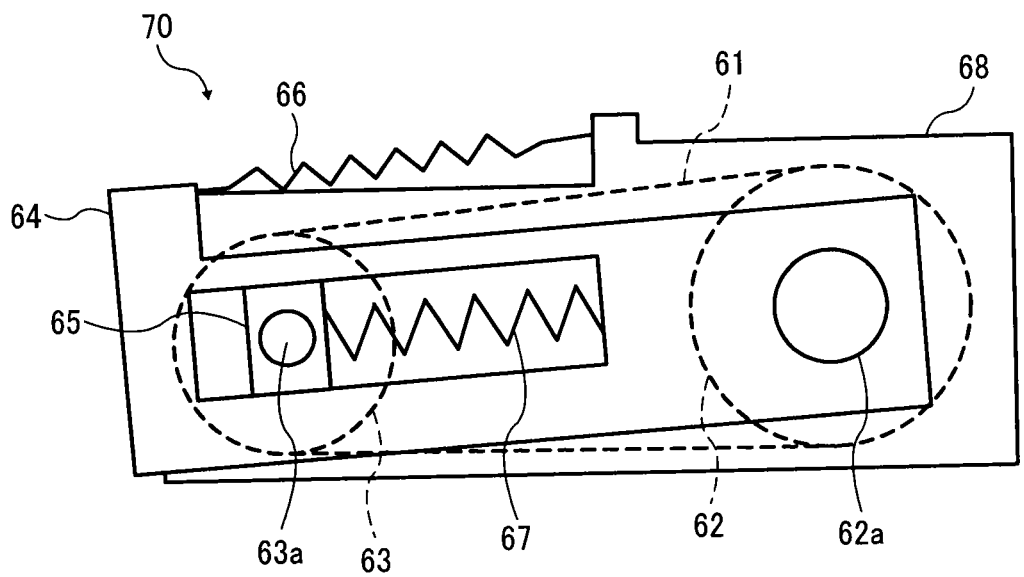
FIG. 3 schematically illustrates a structure of the shaft leaning device after a belt walk regulation, viewed axially along the separation roller.

FIG. 2 schematically illustrates a structure of the shaft leaning device 70 of the secondary transfer unit 60 immediately after the shaft leaning device is attached to the printer, viewed axially along the separation roller 63. FIG. 3 schematically illustrates a structure of the shaft leaning device after the belt walk regulation, viewed axially along the separation roller 63.

Lateral ends of a rotary shaft 63a of the separation roller 63 according to the present embodiment are supported by rotary shaft support arms 64, respectively. Each rotary shaft support arm 64 is rotatably attached to each end of a rotary shaft 62a of the secondary transfer roller 62, and is pressed to a clockwise direction in FIG. 2 by an arm spring 66 of which one end is fixed to a frame 68 of the secondary transfer unit 60. Immediately after mounting the secondary transfer belt 61, the secondary transfer belt 61 has no walk, and a rotary position of the rotary shaft support arm 64 is retained at a position in which the rotary shaft support arm 64 is contacted against the frame 68 by a biasing force of the arm spring 66 (see FIG. 2).

In addition, as illustrated in FIGS. 2 and 3, each of the rotary shaft support arms 64 supports a shaft bearing 65 of the rotary shaft 63a of the separation roller 63 such that the shaft bearing 65 slidably moves from a rotary center of the rotary shaft support arms 64 toward a radial direction. A tension spring 67 applies biasing force to the shaft bearing 65 against the rotary shaft support arms 64 from the rotary center of the rotary shaft support arms 64 in the outward radial direction. With this structure, the separation roller 63 is continuously subjected to a biasing force so as to separate from the secondary transfer roller 62, thereby applying a predetermined tension to the secondary transfer belt 61 entrained around the separation roller 63 and the secondary transfer roller 62.

Figure 4:
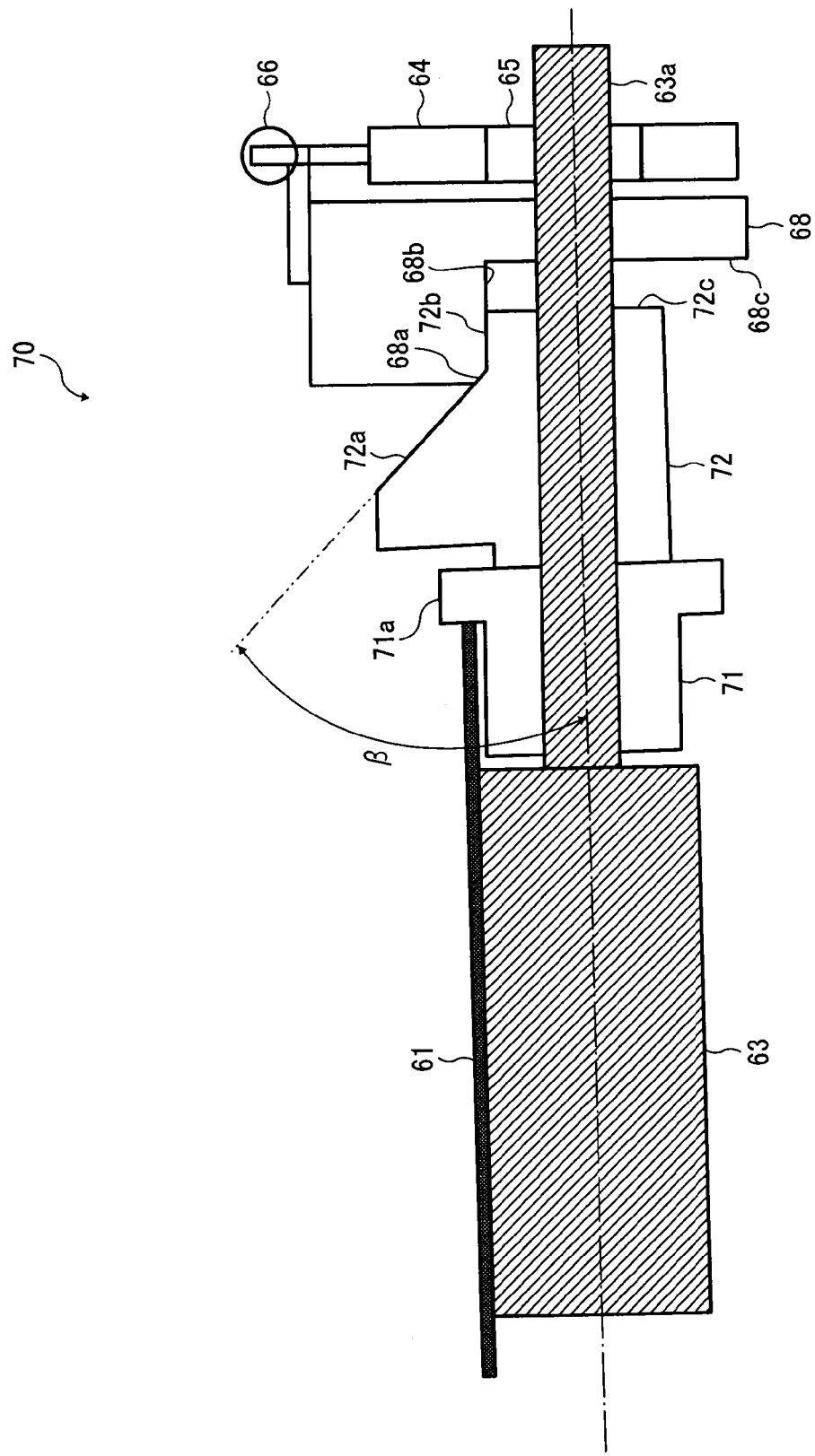
FIG. 4 is a schematic cross-sectional view of the shaft leaning device along a rotary shaft of the separation roller, immediately after installation in the printer.

FIG. 4 is a schematic cross-sectional view of the shaft leaning device 70 of the secondary transfer unit 60 viewed along the rotary shaft 63a of the separation roller 63.

A belt walk detector 71 and a shaft leaning member 72 form a shaft direction displacement member, which is disposed on the rotary shaft 63a between the separation roller 63 and the shaft bearing 65. The belt walk detector 71 includes a flange 71a that contacts an edge of the secondary transfer belt 61. When the secondary transfer belt 61 moves widthwise of the belt and the edge of the secondary transfer belt 61 contacts the flange 71a, the belt walk detector 71 moves outwardly in the shaft direction along the rotary shaft 63a of the separation roller 63, as a result of which the shaft leaning member 72 disposed further outside the rotary shaft 63a moves outwardly in the shaft direction along the rotary shaft 63a.

The shaft leaning member 72 includes a slanted surface 72a. The frame 68 as a fixed member includes a contact face 68a. The contact face 68a of the frame 68 contacts the slanted surface 72a of the shaft leaning member 72 outboard of the rotary shaft 63a. In this case, because the end of the rotary shaft 63a of the separation roller 63 on which the shaft leaning member 72 is disposed is supported by the rotary shaft support arm 64 that is biased by the arm spring 66 via the shaft bearing 65, the rotary shaft 63a receives a biasing force directed upward in FIG. 4. Further, the shaft leaning member 72 further includes a stopped face 72b disposed below the slanted surface 72a and the frame 68 includes a stopper face 68b. When the end of the secondary transfer belt 61 does not contact the flange 71a of the belt walk detector 71, a contact position between the slanted surface 72a and the contact face 68a is regulated at a position where the stopper face 68b contacts the stopped face 72b due to a biasing force of the arm spring 66. Specifically, the shaft leaning device 70 is retained in a state in which the contact face 68a of the frame 68 contacts the slanted surface 72a of the shaft leaning member 72.

Figure 5:
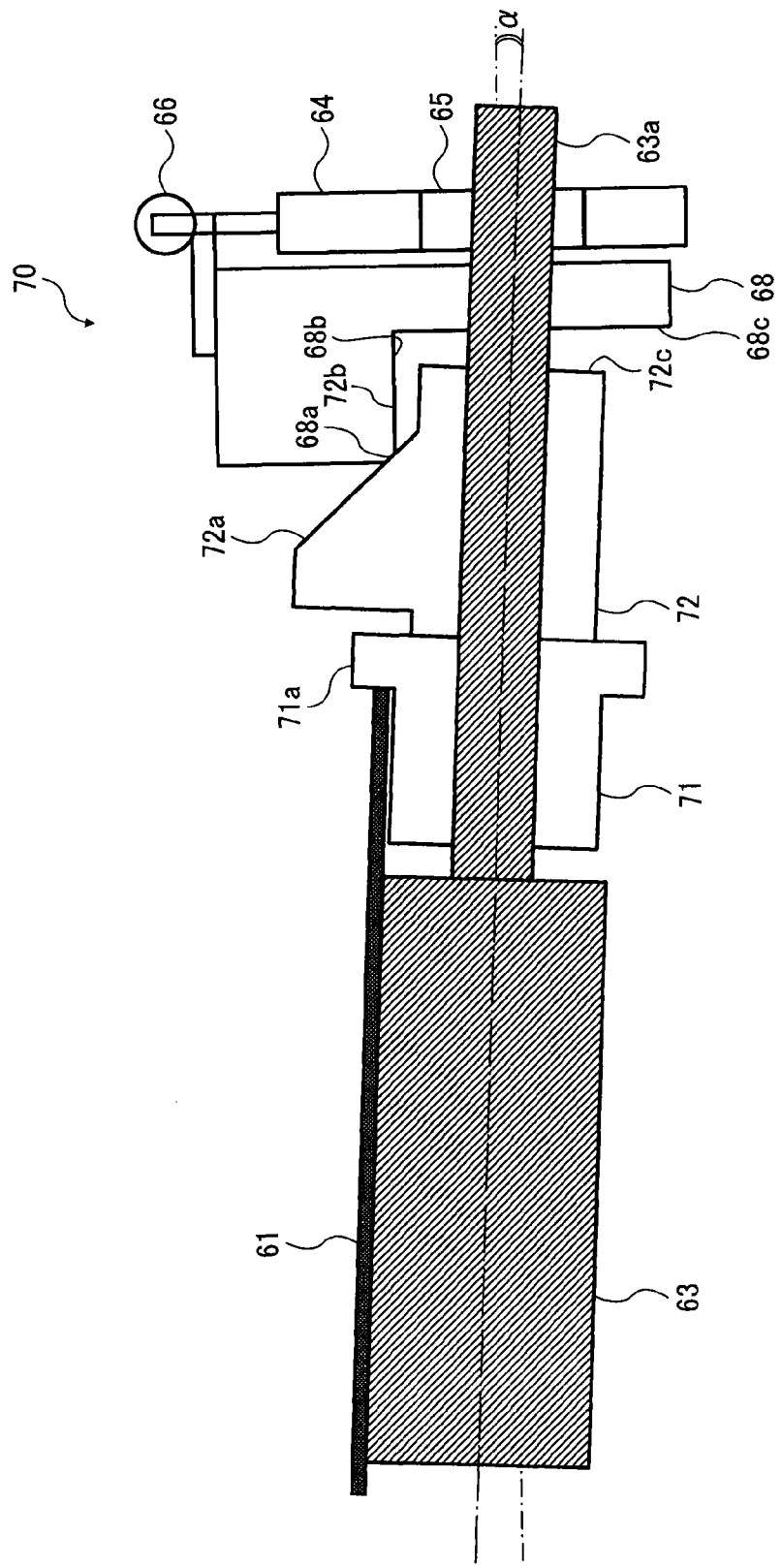
FIG. 5 is a schematic cross-sectional view of the shaft leaning device along a rotary shaft of the separation roller after the belt walk regulation.

From this state, when the secondary transfer belt 61 receives a force to move widthwise of the belt, and the belt walk detector 71 and the shaft leaning member 72 move outwardly in the shaft direction along the rotary shaft 63a, the contact face 68a of the frame 68 relatively moves along the slanted surface 72a of the shaft leaning member 72. With this movement, the contact position between the slanted surface 72a of the shaft leaning member 72 and the contact face 68a of the frame 68 moves upward to an upper side of the slanted surface 72a. As a result, the end of the rotary shaft 63a of the separation roller 63 at an end of the shaft direction in the moving direction of the secondary transfer belt 61 is pressed downward against a biasing force of the arm spring 66 as illustrated in FIG. 5. At this time, the opposite end of the rotary shaft 63a of the separation roller 63 in a direction reverse to the movement of the secondary transfer belt 61 is held such that the contact face 68a of the frame 68 contacts a lower portion of the slanted surface 72a of the shaft leaning member 72 because the end of the secondary transfer belt 61 does not contact the flange 71*a* of the belt walk detector 71 as illustrated in FIG. 4. As a result, the end of the rotary shaft 63*a* of the separation roller 63 at an end of the shaft direction in the moving direction of the secondary transfer belt 61 is pressed downward against a biasing force of the arm spring 66 as illustrated in FIG. 5.

Thus, as the rotary shaft 63*a* of the separation roller 63 inclines, moving speed of the secondary transfer belt 61 in the belt width direction gradually slows, and finally, the secondary transfer belt 61 starts to move in reverse to the belt width direction. As a result, the secondary transfer belt 61 gradually returns to its original position, and the secondary transfer belt 61 stably runs. This description is of a case in which walk of the secondary transfer belt 61 occurs in an opposite direction.

Hereinafter, the concept of counteracting belt walk by tilting the rotary shaft 63*a* of the separation roller 63 is described with reference to FIG. 6.

Figure 6:
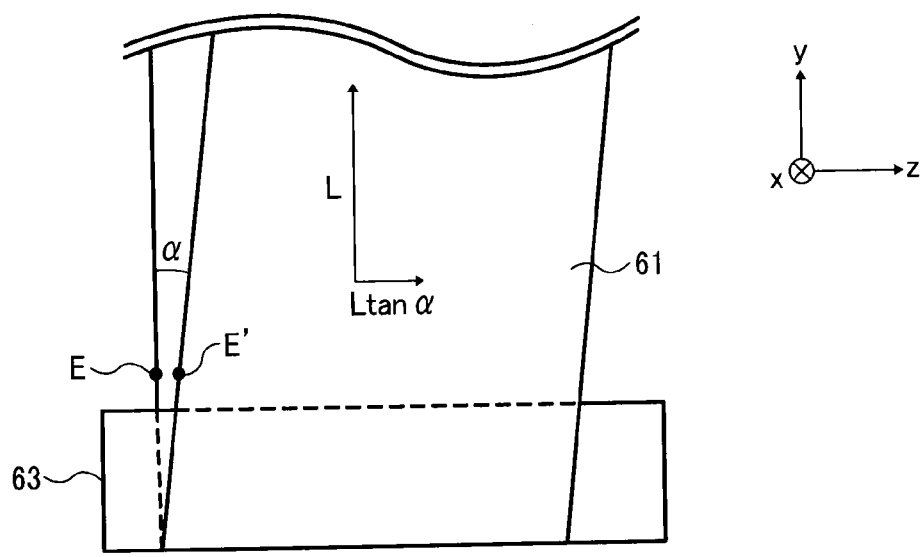
FIG. 6 illustrates belt walk of the secondary transfer belt.

FIG. 6 illustrates a belt walk of the secondary transfer belt 61. Assume that the secondary transfer belt 61 is formed of a rigid material, and attention is to be paid to an arbitrary point on the secondary transfer belt 61 before reaching the separation roller 63 (herein, a point E on the belt end). If the secondary transfer belt 61 stretched between the two rollers 62, 63 is completely horizontal or parallel, there is no positional deviation between the above point E on the secondary transfer belt 61 immediately before reaching the separation roller 63 and a point E' on the secondary transfer belt 61 immediately after passing through the separation roller 63 corresponding to the above point E. If there is no positional deviation, it is determined that the secondary transfer belt 61 is not walked.

On the other hand, if the rotary shaft 63*a* of the separation roller 63 has a slant angle $\alpha$ with respect to the rotary shaft 62*a* of the secondary transfer roller 62, the point E on the secondary transfer roller 62 displaces toward the rotary shaft direction of the separation roller 63 by an approximate amount $\tan \alpha$ as illustrated in FIG. 6. Accordingly, if the rotary shaft 63*a* of the separation roller 63 is leaned by the slant angle $\alpha$ with respect to the rotary shaft 62*a* of the secondary transfer roller 62, the position of the secondary transfer belt 61 in the belt width direction is moved by approximately $\tan \alpha$ with the rotation of the separation roller 63.

The walk amount of the secondary transfer belt 61 or a moving speed in the belt width direction is proportional to the slant angle $\alpha$. Specifically, as the slant angle $\alpha$ increases, the walk of the secondary transfer belt 61 increases. In the same manner, as the slant angle $\alpha$ decreases, the walk of the belt 61 decreases. Accordingly, for example, as illustrated in FIG. 5, when a belt walk in which the secondary transfer belt 61 tends to approach the right occurs, if the shaft leaning member 72 moves to the rotary shaft direction of the separation roller 63 and the rotary shaft 63*a* of the separation roller 63 lowers, the movement of the secondary transfer belt 61 to return to the left can be generated. Then, the belt walk of the secondary transfer belt 61 can converge to a balanced position between the original belt walk of the secondary transfer belt 61 and a belt walk in an opposite direction of the secondary transfer belt 61 that occurred from inclination of the rotary shaft 63*a* of the separation roller 63. If a further belt walk is caused to the secondary transfer belt 61 running at the balanced position, the rotary shaft 63*a* of the separation roller 63 inclines in accordance with the belt walk amount, so that, again, the secondary transfer belt 61 retreats to another balanced position.

Thus, the shaft leaning device 70 of the secondary transfer unit 60 according to the present embodiment is configured such that an inclination according to the displacement amount of the secondary transfer belt 61 in the belt width direction is given to the rotary shaft 63*a* of the separation roller 63, to thereby correct the belt walk of the secondary transfer belt 61 at an early stage. A moving force of the secondary transfer belt 61 in the belt width direction is used as a driving force to lean the rotary shaft 63*a* of the separation roller 63, so that no dedicated driving force such as a motor is necessary.

Figure 7:
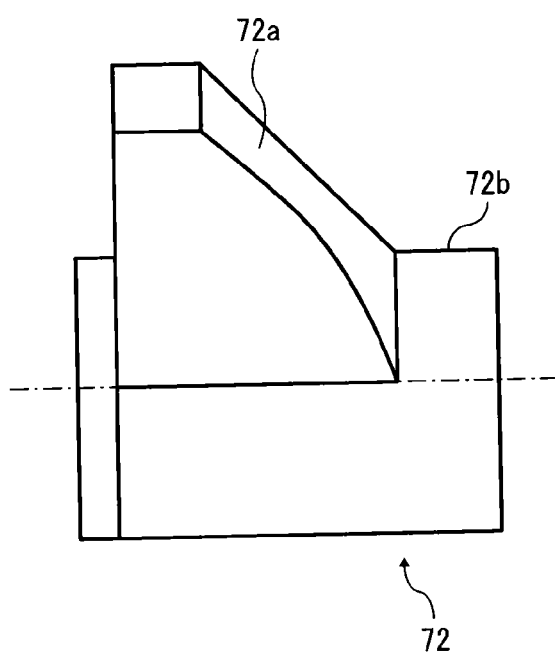
FIG. 7 is a perspective view of the shaft leaning member of the shaft leaning device.

FIG. 7 is a perspective view of the shaft leaning member 72 according to an embodiment of the present invention.

The shaft leaning member 72 includes a cylindrical body and a projection formed on the outer circumferential surface thereof. The projection includes the slanted surface 72*a*. The slanted surface 72*a* forms a part of the circumferential surface of a cone with a center axis of the cylindrical body as a center and includes a curved surface. The slanted surface 72*a* forms a curved surface to prevent the inclination angle of the separation roller 63 from changing even though the shaft leaning member 72 slightly rotates about the rotary shaft 63*a* of the separation roller 63 as well as to lengthen a lifetime of the secondary transfer belt 61 by preventing degradation at an edge of the secondary transfer belt 61 by reducing the area of contact between the contact face 68*a* of the frame 68 and the slanted surface 72*a* to a point to thereby reduce a friction at the contact point and reduce contact pressure between the end of the secondary transfer belt 61 and the belt walk detector 71, and by suppressing degradation at the edge of the secondary transfer belt 61. Moreover, in the present embodiment, the inclination angle $\beta$ of the slanted surface 72*a* with respect to the rotary shaft 63*a* is 30° and preferred materials for the shaft leaning member 72 includes polyacetal or POM, but it's not limited thereto.

The edge of the secondary transfer belt 61 contacts the belt walk detector 71 and bending stress is repeatedly applied to the secondary transfer belt 61, thereby causing damage such as cracks. Accordingly, reinforcing tape is laminated on an edge portion of the external or internal surface of the secondary transfer belt 61.

An example of the separation roller 63 and the secondary transfer belt 61 has the following characteristics.

External diameter of the separation roller: φ15
Material for the separation roller: Aluminum
Material for the secondary transfer belt: Polyimide
Young's modulus of the secondary transfer belt: 3000 Mpa
Frequency of folding endurance of the secondary transfer belt by MIT folding endurance tester: 6,000 times
Thickness of the secondary transfer belt: 80 μm
Linear speed of the secondary transfer belt: 352 mm/s
Belt tension: 0.9 N/cm Measurement of the MIT folding endurance frequency is as defined in JIS-P8115. Measuring conditions include, relative to a sample having a width 15 mm, load of 1 kgf, bending angle of 135 degrees, bending speed of 175 times per minute.

According to the present embodiment, the shaft leaning member 72 moves in the outward shaft direction only within a predetermined range to control an inclination angle of the separation roller 63. The shaft leaning member 72 includes an outside face 72*c* along the shaft direction. The frame 68 includes a stopper face 68*c* along the shaft direction. Specifically, the outside face 72*c* of the shaft leaning member 72 contacts the stopper face 68*c* of the frame 68, so that the shaft leaning member 72 is prevented from moving more along the shaft direction outwardly. Restriction of the movement of the shaft leaning member 72 in the shaft outward direction may be implemented by the rotary shaft support arm 64 or the shaft bearing 65 not limited by the stopper face 68c in the shaft direction of the frame 68. Furthermore, an inclination amount of the rotary shaft of the separation roller 63 can be restricted not limited by the structure restricting the movement of the shaft leaning member 72 in the shaft outward direction, but alternatively, by another structure to directly restrict the deviation of the rotary shaft of the separation roller 63.

Next, a structure between the secondary transfer unit 60 and an attach/detach unit 100 according to the present embodiment will be described.

Figure 8:
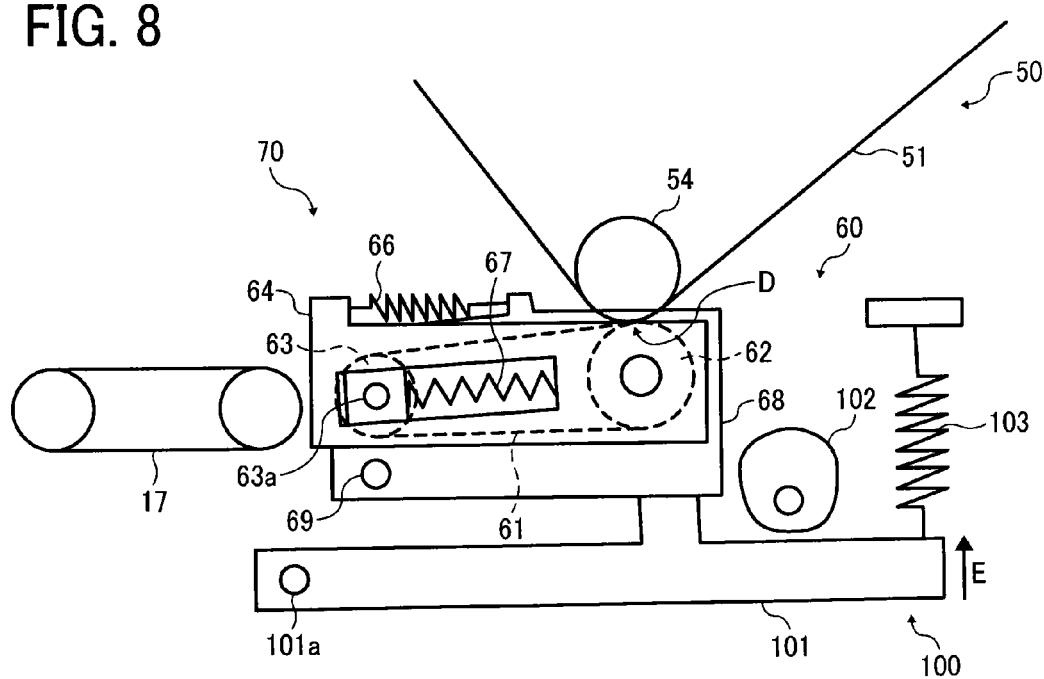
FIG. 8 illustrates a structure including the secondary transfer unit and an attach/detach unit in the printer according to the present embodiment.

FIG. 8 illustrates a structure including the secondary transfer unit 60 and the attach/detach unit 100.

As illustrated in FIG. 8, the secondary transfer belt 61 and the intermediate transfer belt 51 contact each other, the intermediate transfer belt 51 wound around the repulsive force roller 54 of an intermediate transfer unit 50 and the secondary transfer belt 61 disposed opposite the intermediate transfer belt 51 contact each other, thereby forming a secondary transfer nip D.

The secondary transfer unit 60 according to the present embodiment is disposed rotatably about a rotary shaft 69 as a rotation supporting point. Herein, the rotation means being rotatable in forward and reverse directions. The rotary shaft 69 of the secondary transfer unit 60 according to an embodiment positions beneath the rotary shaft 63a of the separation roller 63 as illustrated in FIG. 8.

In addition, in the present embodiment, considering paper jams that may be taken place in the secondary transfer nip D and operability, the attach/detach unit 100 is disposed to separate the secondary transfer belt 61 from the intermediate transfer belt 51 by rotating the secondary transfer unit 60 and tilting the secondary transfer unit 60. This attach/detach unit 100 disposed in the bottom of FIG. 8 and below the frame 68 of the secondary transfer unit 60 includes a pressure arm 101, an attach/detach cam 102, a compression spring 103, a manual lever, and the like.

As illustrated in FIG. 8, when the secondary transfer belt 61 and the intermediate transfer belt 51 contact each other, the pressure arm 101 pressed by the compression spring 103 rotates about a rotary shaft 101a of the pressure arm 101 in a direction of an arrow E in FIG. 8, and contacts the frame 68 of the secondary transfer unit 60 with pressure. The secondary transfer belt 61 disposed in the secondary transfer unit 60 is caused to contact the intermediate transfer belt 51 by the above pressing force.

Next, attaching and detaching operation of the secondary transfer belt 61 with the intermediate transfer belt 51 will be described.

Figure 9:
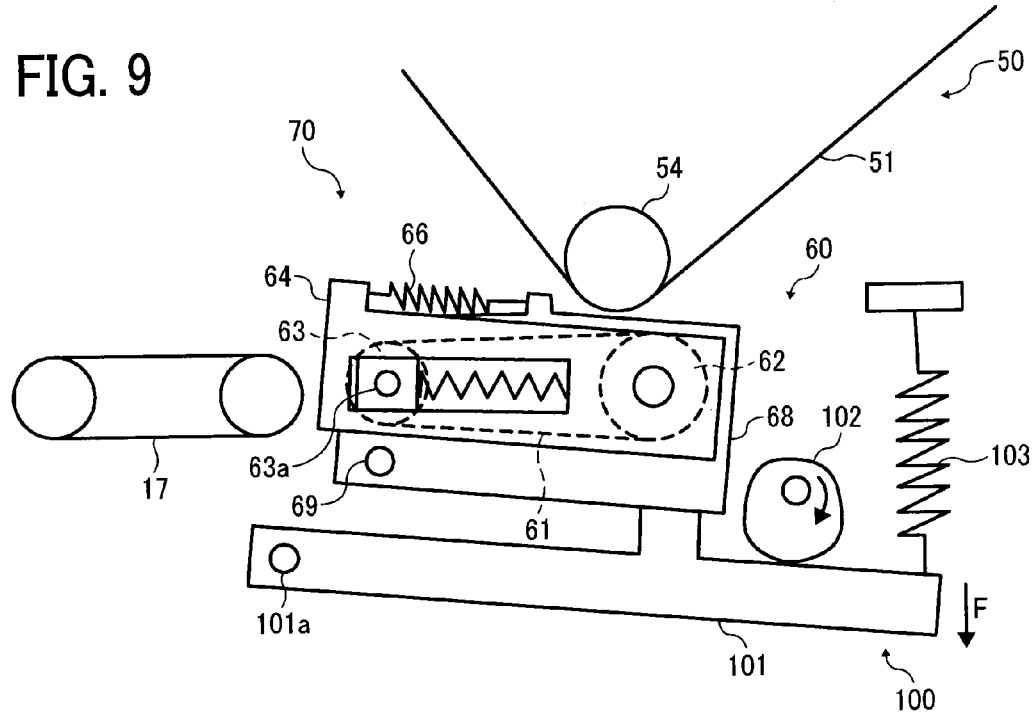
FIG. 9 illustrates operation of the attach/detach unit.

FIG. 9 illustrates operation of the attach/detach unit 100.

In the present embodiment, when handling a removal of jammed paper at the secondary transfer nip D or in the maintenance, the intermediate transfer belt 51 can be separated from the secondary transfer belt 61 by operating the manual lever. More specifically, when the manual lever is operated, the attach/detach cam 102 rotates in a direction of an arrow in the figure, a surface of the attach/detach cam 102 and the pressure arm 101 contact, so that the pressure arm 101 is pushed down as indicated by an arrow F in FIG. 9. Because the pressure arm 101 is pushed down in the arrow F direction, the pressing force by the compression spring 103 applied to the frame 68 of the secondary transfer unit 60 via the pressure arm 101 is reduced. The secondary transfer unit 60 that is not affected by the pressing force of the compression spring 103, rotates about the rotary shaft 69 with its own weight in the arrow F direction and inclines, and the secondary transfer belt 61 disposed at the secondary transfer unit 60 is separated from the intermediate transfer belt 51.

In the present embodiment, the rotary shaft 69 as a rotation supporting point of the secondary transfer unit 60 is positioned below the rotary shaft 63a of the separation roller 63, assuming that the secondary transfer nip D is an upper side relative to the rotary shaft 63a of the separation roller 63 in the direction perpendicular to the direction in which the secondary transfer belt 61 is stretching and that the opposite side is a lower side.

With this, the shaft leaning device 70 disposed on the separation roller 63 takes an upper position relative to the rotary shaft 69 of the shaft leaning device 70. When the secondary transfer belt 61 separates from the intermediate transfer belt 51, if the secondary transfer unit 60 rotates in the clockwise direction in FIG. 8, a portion near the conveyance belt 17 disposed downstream of the secondary transfer unit 60 moves to the right or the upper right. With this movement, the shaft leaning device 70 moves toward a direction separating from the conveyance belt 17 disposed in the vicinity of the shaft leaning device 70. As a result, when the secondary transfer belt 61 is separated from the intermediate transfer belt 51, peripheral parts such as the conveyance belt 17 disposed in the circumference of the shaft leaning device 70 are prevented from interfering with the shaft leaning device 70, and thus, the damage due to interference and contact can be prevented.

The arm spring 66 applies tension to the separation roller 63 via the shaft bearing 65 and the rotary shaft support arm 64. In the present embodiment, the arm spring 66 is disposed on the side of the secondary transfer nip D compared to the rotary shaft 69 of the secondary transfer unit 60, in the direction perpendicular to the stretching direction of the secondary transfer belt 61 that the intermediate transfer belt 51 contacts.

With this configuration, when the secondary transfer belt 61 is separated from the intermediate transfer belt 51, the arm spring 66 as a part of the belt walk regulator is prevented from interfering with or contacting the conveyance belt 17 disposed around the belt walk regulator, thereby preventing any damage to the conveyance belt 17.

Further, in the present embodiment, the arm spring 66 applies a biasing force to cause the rotary shaft 63a of the separation roller 63 to be directed to the secondary transfer nip D. With this structure, when the secondary transfer belt 61 is separated from the intermediate transfer belt 51, even though the secondary transfer unit 60 is inclined, the arm spring 66 applies a biasing force to rotate the rotary shaft support arm 64 in the clockwise direction as illustrated in FIG. 9. As a result, the conveyance belt 17 of the secondary transfer unit 60 is prevented from interfering with or contacting the rotary shaft support arm 64 as a part of the shaft leaning device 70, so that any damage due to interference/contact can be prevented.

Next, a comparative example in which a rotary supporting point of the secondary transfer unit 60 is disposed at a different position of the secondary transfer unit 60 according to the present embodiment will be described.

Figure 10:
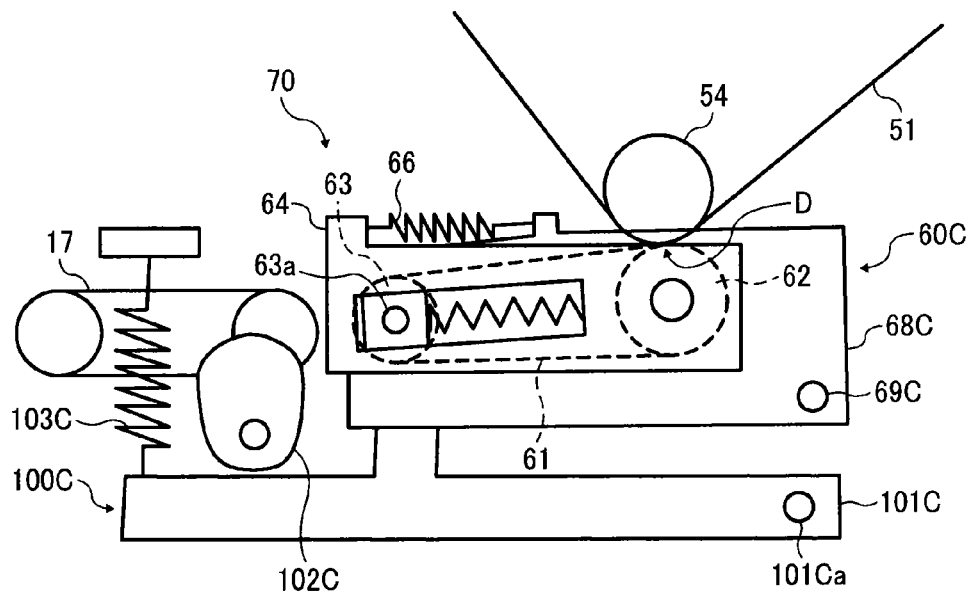
FIG. 10 shows a comparative example relative to the secondary transfer unit according to the present embodiment.

FIG. 10 shows an operation of the comparative example relative to the secondary transfer unit 60.

As illustrated in FIG. 10, the rotary shaft 69C of the secondary transfer unit 60C according to the comparative example positions at a side of the secondary transfer roller 62 in the conveyance direction of the secondary transfer belt 61 relative to the secondary transfer nip, and positions at an opposite side of the secondary transfer nip D in a direction perpendicular to the stretched surface of the secondary transfer belt 61. The attaching and detaching operation of the secondary transfer belt 61 with the intermediate transfer belt 51 is the same as in the present embodiment, and a description thereof is thus omitted.

Figure 11:
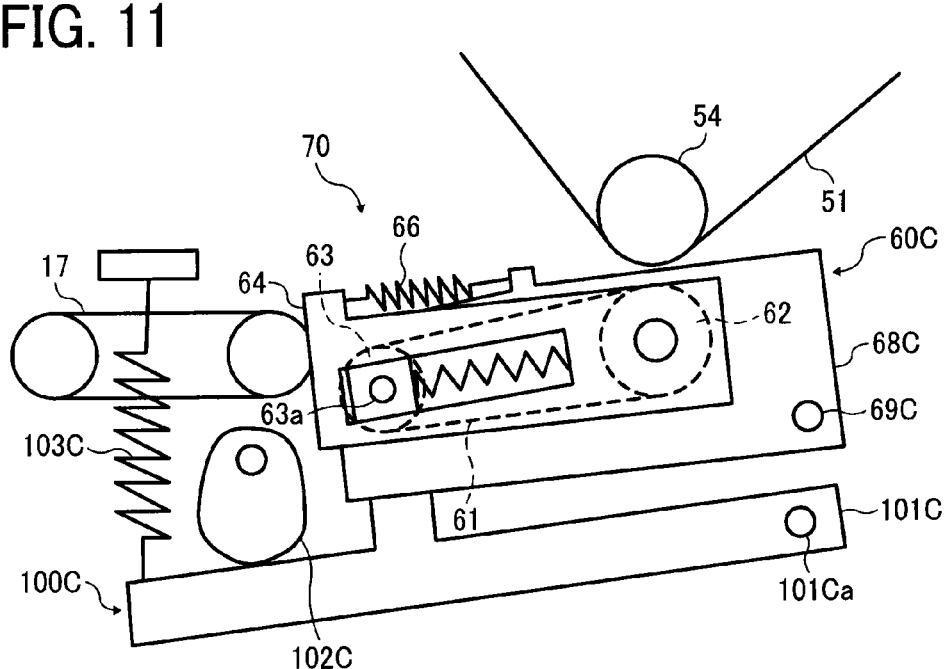
FIG. 11 shows an operation of the comparative example relative to the secondary transfer unit.

As illustrated in FIG. 11, when the intermediate transfer belt 51 is separated from the secondary transfer belt 61 in the secondary transfer unit 60C, the rotary shaft 63a of the separation roller 63 including the belt walk regulator of the secondary transfer unit 60C rotates in a reverse direction to the secondary transfer nip D. With this structure, a rotating range of the shaft leaning device 70 extends beyond the stretching direction of the secondary transfer belt 61 of the secondary transfer unit 60C. As a result, the conveyance belt 17 contacts a part of the shaft leaning device 70 disposed at the separation roller 63.

By making the secondary transfer unit 60C as a comparative example compact, contact with other peripheral parts can be prevented. In this case, however, because the circumferential length of the secondary transfer belt 61 becomes shorter, the secondary transfer belt 61 is worn in a short time of period. In addition, by making the secondary transfer unit 60C compact, distance between the secondary transfer unit 60C and the conveyance belt 17 disposed downstream of the secondary transfer unit 60C is longer. As a result, there is a possibility that a leading end of the transfer sheet P separated from the secondary transfer belt 61 cannot land on the outer circumferential surface of the conveyance belt 17 smoothly. When the leading end of the transfer sheet P cannot land on the outer circumferential surface of the conveyance belt 17 smoothly, a large impact is applied to the transfer sheet P on which unfixed toner image is carried, the toner image is disturbed, and/or jamming of the transfer sheet P might occur.

In the present embodiment, when the secondary transfer belt 61 is separated from the intermediate transfer belt 51, the rotary shaft 63a of the separation roller 63 rotates toward the secondary transfer nip D, so that the shaft leaning device 70 disposed around the shaft leaning device 70 leans in a direction separating from the conveyance belt 17. With this, compared to the case in which the secondary transfer unit 60C is made compact, interference and contact between the secondary transfer unit 60C and the conveyance belt 17 can be prevented without widening a distance between the secondary transfer unit 60C and the conveyance belt 17.

In addition, in the present embodiment, a belt device is described using the secondary transfer unit 60C. Without limiting to this, the present embodiment may be applied to a belt device to convey a recording medium by contacting the latent image carrier in the image forming apparatus that directly transfers the latent image from the latent image carrier such as a photoconductor to the recording medium without intermediary of the intermediate transfer member.

Furthermore, the present embodiment employs the shaft leaning device 70 as a shaft displacement mechanism; however, not limited to the embodiment for the purpose of controlling the belt walk, the present embodiment may be applied to a belt device employing a shaft displacement mechanism to displace any of the rotary shafts of the supporting rotary member around which the belt member is entrained.

The aforementioned embodiments are examples and specific effects can be obtained for each of the following aspects of (A) to (F):

Aspect A

A belt device such as a secondary transfer unit 60 includes an endless belt member such as a secondary transfer belt 61; a plurality of rotary supporting members such as a separation roller 63 and a secondary transfer roller 62 to support the endless belt with tension; a contacted member such as an intermediate transfer belt 51 that contacts the endless belt; and a shaft displacement device such as the shaft leaning device 70 to displace any of the rotary shafts of the plurality of rotary supporting members. The belt device positions at a side of the rotary shaft such as the rotary shaft 63a of the separation roller 63 moved by the shaft displacement device in the stretching direction of the stretched surface of the belt member (61) that the contacted member (51) contacts relative to the contact position such as a secondary transfer nip D between the belt member and the contacted member, and includes a rotary supporting point such as the rotary shaft 69 that positions at an opposite side of the contacted member in the direction perpendicular to the stretching direction. When the plurality of rotary supporting members rotates about the rotary supporting point (69), the belt member (61) is separated from the contacted member (51).

With this structure, as described in the above embodiments, the secondary transfer belt 61 as a belt member is separated from the intermediate transfer belt 51 as a contacted member, the secondary transfer unit 60 as a belt device rotates about a rotary shaft 69 in the clockwise direction. With this movement, the shaft leaning device 70 moves toward a direction separating from the conveyance belt 17 disposed in the vicinity of the shaft leaning device 70. As a result, when the secondary transfer belt 61 is separated from the intermediate transfer belt 51, peripheral parts such as the conveyance belt 17 disposed in the circumference of the shaft leaning device 70 are prevented from interfering with the shaft leaning device 70, and thus, the damage due to interference and contact can be prevented.

Aspect B

In Aspect A, the rotary shaft 69 as a rotation supporting point of the secondary transfer unit 60 is positioned below the rotary shaft 63a of the separation roller 63, assuming that the secondary transfer nip D is an upper side relative to the rotary shaft 63a of the separation roller 63 in the direction perpendicular to the direction in which the secondary transfer belt 61 is stretching and that the opposite side is a lower side.

With this, the shaft leaning device 70 disposed on the separation roller 63 takes an upper position relative to the rotary shaft 69 of the shaft leaning device 70. When the secondary transfer belt 61 separates from the intermediate transfer belt 51, if the secondary transfer unit 60 rotates in the clockwise direction in FIG. 8, a portion near the conveyance belt 17 disposed downstream of the secondary transfer unit 60 among the portions of the shaft leaning device 70, moves to the right or the upper right. With this movement, the shaft leaning device 70 moves toward a direction separating from the conveyance belt 17 disposed in the vicinity of the shaft leaning device 70. As a result, when the secondary transfer belt 61 is separated from the intermediate transfer belt 51, peripheral parts such as the conveyance belt 17 disposed in the circumference of the shaft leaning device 70 are prevented from interfering with the shaft leaning device 70, and thus, the damage due to interference and contact can be prevented.

Aspect C

In Aspects A and B, the secondary transfer unit 60 employs a shaft leaning device 70 to control the belt walk amount. The shaft leaning device 70 allows a rotary shaft 63a of the separation roller 63 as one of the support rollers around which the secondary transfer belt 61 is entrained to lean so as to keep a belt walk of the secondary transfer belt 61 that moves in the belt width direction within a predetermined range.

With this structure, the belt device even including an attach/detach device to separate the belt member from the contacted member that the belt member contacts can eliminate a belt walk in which the secondary transfer belt 61 displaces to one end in the belt width direction.

Aspect D

In Aspect C, the belt walk regulator such as the shaft leaning device 70 includes a biasing means such as an arm spring 66 to indirectly apply biasing force to the rotary supporting member such as the separation roller 63 inclined by the belt walk regulator, and the arm spring 66 is positioned at a side of the contact position between the contacted member in the direction perpendicular to a direction around which the belt member is entrained and relative to the rotary supporting point of the belt device.

With this configuration, when the secondary transfer belt 61 is separated from the intermediate transfer belt 51, the arm spring 66 as a part of the belt walk regulator is prevented from interfering with or contacting the conveyance belt 17 disposed around the belt walk regulator, thereby preventing any damage to the conveyance belt 17.

Aspect E

In Aspect C or D, the belt walk regulator such as the shaft leaning device 70 includes a biasing means such as an arm spring 66 to indirectly apply a biasing force to the rotary supporting member such as the separation roller 63, and the arm spring 66 is positioned at a side of the contact position between the contacted member and the belt member in the direction perpendicular to the stretching surface of the belt member, relative to the belt device such as the secondary transfer belt 61.

With this structure, when the secondary transfer belt 61 is separated from the intermediate transfer belt 51, even though the secondary transfer unit 60 is inclined, the arm spring 66 applies a biasing force to rotate the rotary shaft support arm 64 in the clockwise direction as illustrated in FIG. 9. As a result, the conveyance belt 17 of the secondary transfer unit 60 is prevented from interfering with or contacting the rotary shaft support arm 64 as a part of the shaft leaning device 70, so that any damage due to interference/contact can be prevented.

Aspect F

The image forming apparatus includes a belt device as described in any of the above aspects.

As a result, in the image forming apparatus including a plurality of rotary support members to support the belt member with tension, and a shaft leaning device to lean any of the rotary shafts of the plurality of rotary support members, when the secondary transfer belt 61 is separated from the intermediate transfer belt 51, peripheral parts such as the conveyance belt 17 disposed in the circumference of the shaft leaning device 70 are prevented from interfering with the shaft leaning device 70, and thus, the damage due to interference and contact can be prevented.

Additional modifications and variations of the present invention are possible in light of the above teachings. It is therefore to be understood that, within the scope of the appended claims, the invention may be practiced other than as specifically described herein.

What is claimed is:

1. A belt device for an image forming apparatus, comprising:
   an endless belt;
   a first support roller and a second support roller, each including a rotary shaft, that support the endless belt with tension;
   a contacted member that contacts the endless belt;
   a shaft displacement device to displace any of the rotary shafts of the support rollers; and
   a main rotary shaft disposed at a side of the rotary shaft of the first support roller moved by the shaft displacement device along a stretching direction of a stretched surface of the endless belt that the contacted member contacts, relative to a contact portion between the endless belt and the contacted member, and at an opposite side of the contacted member in a direction perpendicular to the stretching direction of the endless belt,
   wherein, as the first support roller and the second support roller rotate about the main rotary shaft, the endless belt is separated from the contacted member.

2. The belt device as claimed in claim 1, wherein the main rotary shaft is positioned below the rotary shaft of the first support roller that the shaft displacement device displaces, and
   wherein the contact portion is at an upper side and an opposite side of the contact portion is at a lower side in the direction perpendicular to the stretching direction of the endless belt.

3. The belt device as claimed in claim 1, wherein the shaft displacement device is a belt walk regulator that regulates belt walk by tilting the rotary shaft of the first support roller as one of the support rollers around which the belt device is entrained to keep a belt walk amount of the endless belt that moves in a width direction of the endless belt within a predetermined range.

4. The belt device as claimed in claim 3, wherein the belt walk regulator further comprises an arm spring to indirectly apply a biasing force to the support rollers, and
   wherein the arm spring is positioned at a side of the contact portion between the endless belt and the contacted member in the direction perpendicular to the stretching direction of the stretched surface of the endless belt, relative to the main rotary shaft of the belt device.

5. The belt device as claimed in claim 3, wherein the belt walk regulator further comprises an arm spring to indirectly apply a biasing force to the support roller that the belt walk regulator tilts, and the arm spring applies the biasing force to move the rotary shaft of the support roller toward the contact portion between the endless belt and the contacted member.

6. An image forming apparatus comprising the belt device as claimed in claim 1.

7. A secondary transfer unit for an image forming apparatus, comprising:
   a secondary transfer belt;
   a secondary transfer roller including a rotary shaft and a separation roller including a rotary shaft, the secondary transfer roller and the separation roller supporting the secondary transfer belt with tension;
   an intermediate transfer belt that contacts the secondary transfer belt;

a shaft leaning device to displace any of the rotary shafts of the separation roller and the secondary transfer roller; and a main rotary shaft disposed below the rotary shaft of the separation roller, wherein the main rotary shaft is positioned at a side of the rotary shaft of the separation roller moved by the shaft leaning device along a stretching direction of a stretched surface of the secondary transfer belt that the intermediate transfer belt contacts, relative to a contact portion between the secondary transfer belt and the intermediate transfer belt, and the main rotary shaft is positioned at an opposite side of the intermediate transfer belt in a direction perpendicular to the stretching direction of the stretched surface of the secondary transfer belt, wherein, as the separation roller and the secondary transfer roller rotate about the main rotary shaft, the secondary transfer belt is separated from the intermediate transfer belt.

8. An image forming apparatus comprising the secondary transfer unit as claimed in claim 7.

\* \* \* \* \*